(12) United States Patent
Tokonabe et al.

(10) Patent No.: US 6,828,001 B2
(45) Date of Patent: Dec. 7, 2004

(54) VACUUM HEAT-INSULATING PANEL AND METHOD OF MANUFACTURING THE SAME

(75) Inventors: Hideo Tokonabe, Tokyo (JP);
Katsuhiko Umeda, Tokyo (JP)

(73) Assignee: Jamco Corporation, Tokyo (JP)

( * ) Notice: Subject to any disclaimer, the term of this patent is extended or adjusted under 35 U.S.C. 154(b) by 115 days.

(21) Appl. No.: 10/125,390

(22) Filed: Apr. 19, 2002

(65) Prior Publication Data

US 2002/0172794 A1 Nov. 21, 2002

(30) Foreign Application Priority Data

May 18, 2001 (JP) ...................................... 2001-148888

(51) Int. Cl.[7] .................................................. B32B 1/06
(52) U.S. Cl. ........................... 428/69; 428/73; 428/116
(58) Field of Search ........................... 428/69, 73, 116; 156/286

(56) References Cited

U.S. PATENT DOCUMENTS 6,436,505 B2 * 8/2002 Kuroda et al. ................ 428/69

FOREIGN PATENT DOCUMENTS

| JP | 9-166272 | 6/1997 |
| JP | 10-89589 | 4/1998 |
| JP | 11-280199 | 10/1999 |

* cited by examiner

*Primary Examiner*—Alexander S. Thomas
(74) *Attorney, Agent, or Firm*—Westerman, Hattori, Daniels, Adrian LLP.

(57) ABSTRACT

The present invention is directed to cost-effectively provide a high-strength large vacuum heat-insulating panel with a honeycomb core of non-permeable independent cells by means of simplified instruments and method. One goal of the invention is that the core retains an original shape at its lateral ends from the beginning of a procedure of evacuating air into a vacuum condition till the end of panel bonding, and another is ensuring a long lasting air-tight sealing in the honeycomb core. The vacuum heat-insulating panel 100 according to the invention includes a vacuum core element (50) of non-permeable honeycomb structure and a surface element (60) bonded thereto by fusing an air-permeable bonding element (woven cloth made of fibrous adhesive of thermoplastic resin or unwoven cloth of the fibrous adhesive) 70. The surface element 60 has its edges bent to provide protection covers 65.

14 Claims, 10 Drawing Sheets

(a) Woven Cloth (b) Unwoven Cloth (a)

(b)

(c)

VACUUM HEAT-INSULATING PANEL AND METHOD OF MANUFACTURING THE SAME

FIELD OF THE INVENTION

The present invention relates to a vacuum heat-insulating panel having heat insulating and sound blocking features, and a method of manufacturing the same.

DESCRIPTION OF THE RELATED ART

Conventionally, there have been developed various panels and blocks having their respective inner spaces retained in vacuum to attain enhanced heat insulating capability. A vacuum heat-insulating block has its surface covered with flexible substance and its inside depressurized to provide a vacuum pack configuration, and such a configuration leaves the block unsatisfied in strength. To overcome this disadvantage, an improved vacuum block has its surface bonded with a rigid surface material to enhance its heat insulating property and rigidity. An improved heat-insulating panel is designed in a sandwich-like multi-layered configuration with a core element having a surface element superposed at its front and rear surfaces, retaining the inside of the core element in vacuum condition to attain enhanced properties of thermal break and strength.

A vacuum heat-insulating block or a vacuum panel does not transmit sound and thus advantageously has a sound blocking property and a heat insulating property. However, in an exemplary panel with the core element formed of continuous foam material which transmits sound, it has been found that heat and sound transmissibility levels are raised depending on the density of the core element, and therefore, it is desired to develop the core element for the vacuum heat-insulating panel that is reduced in density but enhanced in strength.

In view of obtaining the heat insulating and sound blocking features, the core element is desirably fabricated of a substance of low density. On the contrary, the core element must be sufficiently strong especially against compression and shearing forces, and for that purpose, it should desirably be fabricated of a substance of high density. It has long been desired to selectively obtain substances for the core element (e.g., continuous foam material) that meet such contradictory requirements.

Thus, a honeycomb core of assembled basaltiform or cylindrical cells is devised, which is suitable to be used as the core element of the vacuum heat-insulating panel because of its high compression and shearing strengths in contrast with relatively low density. The multi-layered panel having the core element in honeycomb structure and surface materials superposed at its front and rear sides is generally known as "honeycomb panel", and especially, for such honeycomb panel used for structures, the honeycomb core serving as a core element is fabricated of a selected material excellent in shearing strength and shearing rigidity while the surface element is made of a material superior in tensile stress and compression strength, so as to implement increased flexural strength and rigidity.

In order to further add a heat insulating property to such structural honeycomb panel, the honeycomb core serving as the core element has its in side cells retained in vacuum condition and has its opposite sides superposed with surface materials into a multi-layered configuration so as to accomplish the improved vacuum heat-insulating panel.

Thus, the vacuum heat-insulating panel inherits the strength and rigidity from the honeycomb panel while retaining the inside of the honeycomb core in a vacuum condition.

This type of honeycomb cores can be roughly classified into those having air-permeable cells and those having non-permeable cells, depending on the material of which they are made.

With the air-permeable honeycomb core, all the cells in the panel serve as spaces defined separately but communicating with one another, and thus, a panel can be easily manufactured which has all the inside cells of the honeycomb core in vacuum condition.

With reference to FIG. 12, a method of manufacturing the vacuum heat-insulating honeycomb panel incorporated with an air-permeable honeycomb core will now be described.

Referring to FIG. 12(a) illustrating a set-up procedure, an air-permeable honeycomb core 11 is mounted on a work table 20, having its upper and lower surfaces superposed with bonding films 13 and surface materials 15 in this order. Simultaneously, edge columns 17 are positioned to prevent the ends of the honeycomb core from collapsing.

Referring to FIG. 12(b) illustrating a heating, pressing, and bonding procedure, the upper and lower surfaces of the layered panel element are heated and pressed by a hot press 25 to fuse the bonding films 13 and consequently bond the surface materials to the honeycomb core 11.

Referring to FIG. 12(c) illustrating a depressurizing and sealing procedure, air is pumped out of the inside space of the honeycomb core 11 through a vacuum port 19 connected to a vacuum pump to depressurize the space. After the evacuation of air, the vacuum port 19 is sealed.

In an embodiment disclosed in Japanese Patent Unexamined Publication No. H11-280199 where an air-permeable honeycomb core has its opposite sides bonded to the surface material with the bonding films to depressurize the inside space into a vacuum condition, after air in the inside space of the core is pumped out into vacuum, the edge columns 17 support the honeycomb structure at the opposite edges to prevent the ends of the core from collapsing by the atmospheric pressure.

An example of depressurizing performed before the bonding procedure is shown in FIG. 13.

Both the upper and lower ends 11a of the honeycomb core 11 sufficiently withstand compression by the atmospheric pressure, but lateral ends 11b of the honeycomb core collapse by the atmospheric pressure.

As has been described, the air-permeable design of honeycomb core and the process of developing a vacuum condition after bonding the surface materials thereto advantageously enable the whole core to be evacuated into vacuum, but due to the air-permeability of the cells, the vacuum condition of the whole panel is lost when even a part of the panel loses its air-tight seal, which results in the panel losing the heat insulating and sound blocking features. Additionally, after the layered elements are integrated into a panel, it is impossible to cut it into various shapes or to punch a hole there through. Thus, the panel must be created into a wide variety of dimensions and designs depending on various applications.

An embodiment incorporated with the non-permeable honeycomb core will now be described.

It is a basic requirement that the honeycomb core used for structural members should be rigid. However, if a heat insulating property is especially required, a non-metallic honeycomb is used due to its poor heat conductivity. Particularly, the non-metallic honeycomb core, when used for manufacturing a high-strength panel, is first bonded to other elements into a multi-layered panel element, and thereafter impregnated with fused resin solution while being under spreading and tensile forces to gain increased shearing rigidity, and hence, during such manufacturing procedure, the honeycomb core loses air-permeability.

In the vacuum heat-insulating panel incorporated with the non-permeable honeycomb core, the honeycomb core has its cells defined independent of one another, so the resultant panel would not lose its heat insulating and sound blocking properties even if apart of the panel is damaged to degrade air-tight sealing. Cutting the panel or punching a hole thereto causes the panel to merely locally lose its inherent properties, but advantageously, the panel, as a whole, still retains the preferable properties.

This enables the vacuum heat-insulating high-strength panel to be manufactured in large dimensions and then cut into pieces of required dimensions or to be provided with a hole, depending on applications.

However, there arises some problem with the procedure of evacuating the whole non-permeable honeycomb core into vacuum. Specifically, since the cells of the honeycomb configuration are defined independently, when pumping air out of all the cells to leave the inside space of the panel in a vacuum condition in the course of the manufacturing process, the coating materials and surface materials are depressed due to the atmospheric pressure so that the surface materials or the bonding films block the apertures of the cells to cause difficulty in further evacuating air therefrom.

Moreover, since the honeycomb core itself lacks air-permeability, the core must have its opposite sides bonded to the surface materials after having its inside evacuated into vacuum, but there also arises a problem that at a time when the inside space of the core is put in a vacuum condition, ends of both longitudinal and lateral extensions of the core collapse due to the atmospheric pressure, similar to the aforementioned case.

Japanese Patent Unexamined Publication Nos. H09-166272 and H10-89589 disclose improvements that have overcome the above-mentioned disadvantages, where during the procedure of evacuating the cells into vacuum, the coating materials, the surface materials, and the core element are all placed in a vacuum chamber and respectively set up in positions on a jig, and then, after a vacuum condition is developed in the chamber, the components are bonded together.

As to the technology, the vacuum chamber must be large enough to house the panel, and the chamber must be evacuated into vacuum each time the panel element is carried in or out. Thus, a fabrication of the considerably large panel of this type requires huge equipment, which leads to reduced working efficiency and increased manufacturing cost.

Furthermore, the honeycomb core has its inherent properties deteriorated over time if it has even very little air permeability, so it is desirable to seek for an achievement of non-permeability.

SUMMARY OF THE INVENTION

Accordingly, it is an object of the present invention to cost-effectively provide a large, high-strength vacuum heat-insulating panel incorporated with a honeycomb core of non-permeable independent cells by means of simplified equipment and procedures.

It is another object of the present invention to avoid any deformation of the opposite ends of a lateral extension of the core from the commencement of depressurizing into vacuum till the completion of panel bonding.

It is further another object of the present invention to ensure a long lasting integrity of air-tight sealing in the honeycomb core.

A vacuum heat-insulating panel according to the present invention basically consists of a core element evacuated into a vacuum condition and made of non-permeable material in honeycomb structure, a surface element, and an air-permeable bonding element fused to bond the surface element to the core element.

The bonding element may be either of woven or unwoven cloth made of adhesive fabric of thermoplastic resin, or may be a bonding sheet that has woven or unwoven cloth of adhesive fabric of thermoplastic resin overlapped with a film of thermosetting synthetic resin.

The surface element has its edges bent to provide protection covers, or alternatively, the surface element may have its opposed edges bent with sealing element laid over a gap between the opposed protection covers.

A method of manufacturing the vacuum heat-insulating panel in a multi-layered configuration with a vacuum core element overlaid and bonded with a surface element includes stepwise procedures of superposing the core with surface elements through adhesive interposed therebetween to produce a multi-layered element, covering the multi-layered element with synthetic resin film and evacuating air under the cover of the synthetic resin film into a vacuum condition to produce a vacuum core element, and heating and pressing the covered multi-layered element having the vacuum core element at its center to bond the surface element to the core by the adhesive, the core being made of non-permeable material in honeycomb structure, the adhesive being either woven or unwoven cloth of fibrous thermoplastic resin, the air inside the core being evacuated through pores in the woven or unwoven cloth during the step of evacuating air into a vacuum condition, and the adhesive being fused to bond the surface elements to the core during the step of heating and pressing.

The adhesive may be woven or unwoven cloth of fibrous thermoplastic resin superposed with a film of thermosetting resin into an adhesive multi-layered sheet, and during the step of heating and pressing, the film of thermosetting resin in the adhesive multi-layered sheet is fused and liquidized to fill clearances in a bonding interface between the core and the surface element. Alternatively, a bank may be provided at a lateral end(s) of the multi-layered element to reinforce the core. Otherwise, the surface element may have its edges bent to provide protection covers which reinforce the core during the step of evacuating air into a vacuum condition.

DETAILED DESCRIPTION OF THE PREFERRED EMBODIMENT

Figure 1:
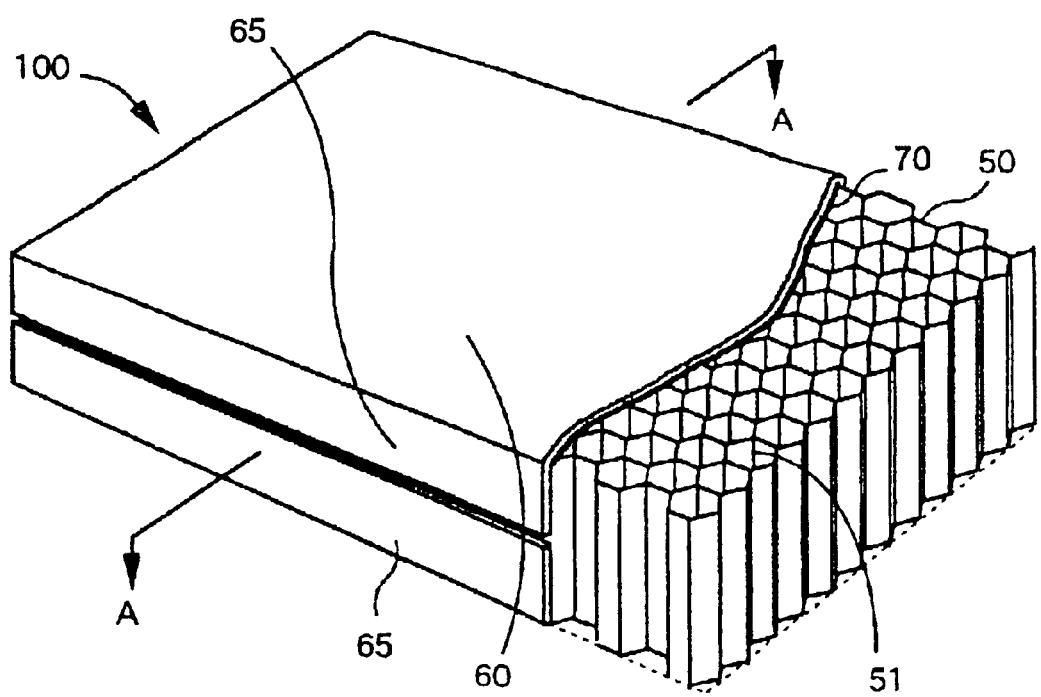
FIG. 1 is a perspective view of a vacuum heat-insulating panel, part of which is cut away.

A vacuum heat-insulating panel according to the present invention is incorporated with a core element of honeycomb-like structure having non-permeable independent cells. In order to develop a vacuum condition inside all the cells, and in order to bond a surface element to the honeycomb core element, woven or unwoven cloth of adhesive fabric is used.

A sufficient time delay is given between a vacuum developing procedure and a heating/pressing procedure, and after the core element is completely evacuated into vacuum at an ambient temperature, the fibrous bonding element is fused under heat and pressure to bond other elements together into a multi-layer element, so that openings of all the cells are sealed to ensure their respective independency.

For the fibrous bonding element, thermoplastic resin is used which is rigid at the ambient temperature, and woven or unwoven cloth made of this fibrous bonding element is air-permeable. The air-permeability of the woven or unwoven cloth made of the fibrous bonding element is exploited in evacuating air. Specifically, if the honeycomb core has no air-permeability, the surface element is pressed under the atmospheric pressure while the openings at the tops and bottoms of the cells are not sealed by the surface element and the bonding element, and thus, pumping air out through a single location enables the whole honeycomb core to be evacuated into a vacuum condition.

After it is confirmed using a vacuum gauge that all the cells have been depressurized into a vacuum condition, the layered element is heated at approximately 150° C. and pressed under approximately 2 Kg/cm$^2$ to fuse the fibrous bonding element and bond the surface element to the core element. The fused fibrous bonding element fixes the surface element to the cells to air-tightly seal the openings, and in this way, the cells are retained independent of one another.

If the bonding element produces gas when heated and fused, degrading the vacuum level inside the cells, a material, such as denatured nylon, polycarbonate, and polyolefin, which is of low evaporating rate in its fused phase is suitable for the fibrous bonding element.

The heat-insulating panel according to the present invention may sometimes be unsatisfactorily sealed by simply fusing the thermoplastic fibrous bonding element, and hence, a supplementary means or film of thermosetting resin is applied between the surface element and the fibrous bonding element to attain improved sealing. Particularly suitable for the thermosetting resin film is epoxy film or thin unwoven cloth impregnated with phenol resin.

The film of thermosetting resin is fused into liquid during the heating stage of the procedure, and it is infiltrated into the pores of the thermoplastic fibrous bonding element and creates fillets on the honeycomb structure, which enhances the air-tight seal.

The heat-insulating panel according to the present invention enables to develop vacuum condition in the ambient air without using a vacuum chamber, and the present invention offers a solution to the prior art disadvantage that ends of the core collapse due to the atmospheric pressure; that is, the surface element has its four ends bent to protect and cover the ends of the core against the atmospheric pressure.

Also, in the heat-insulating panel according to the present invention, junctions where the bent ends of the surface element meet are tightly closed by a seal member to ensure a long lasting non-permeability of the honeycomb core.

Best modes for carrying out the present invention will now be described with reference to the accompanying drawings.

Figure 2:
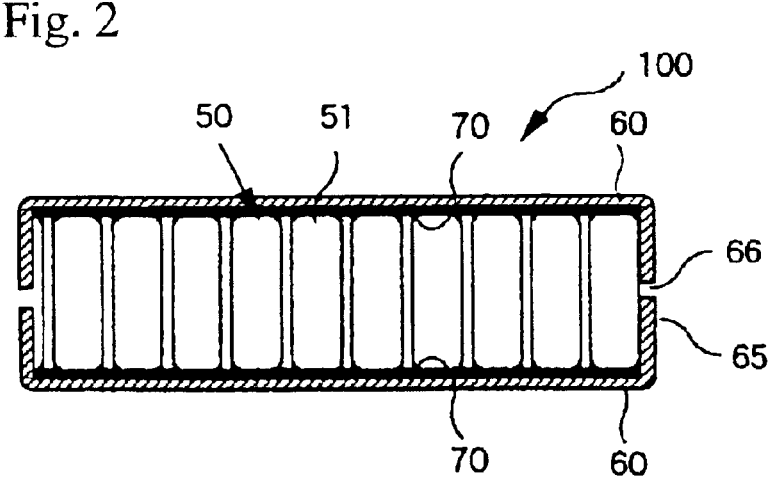
FIG. 2 is a sectional view taken along the line A—A of FIG. 1.
Figure 3:
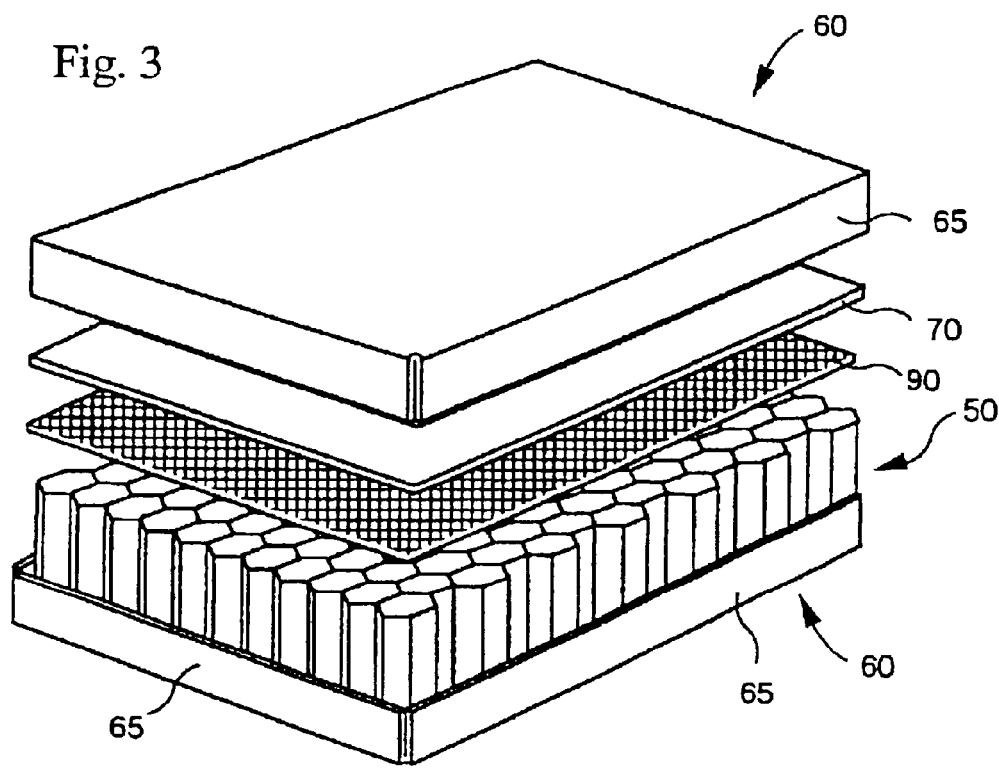
FIG. 3 is a diagram illustrating a configuration of the vacuum heat-insulating panel.

FIG. 1 is a diagram showing a configuration of an exemplary vacuum heat-insulating panel according to the present invention, FIG. 2 is a sectional view taken along the line A—A of FIG. 1, and FIG. 3 is an exploded diagram showing the configuration of the panel.

A vacuum heat-insulating panel 100 has a honeycomb core element 50 covered with a surface element 60 and a synthetic resin film element 80.

The honeycomb core element 50 is an assembly of cells 51 that are hexagonal in respective cross sections.

The honeycomb core element 50 is non-permeable, has low density, and high-strength.

The non-permeable honeycomb core element 50 is produced as listed:

1. It may be made of resin such as polyethylene terephthalate (PET) and polyimide;
2. It may be made of kraft paper or aramid paper impregnated with resin; and/or
3. While it is still in the shape of core block before being sliced into pieces of predetermined thickness, it is soaked in and impregnated with liquid latex rubber.

Applying a small volume of deoxidizing agent in each cell of the honeycomb core element and sealing them in advance can further prevent the degradation of the vacuum level due to incoming air after the fabrication.

In this embodiment of the honeycomb core element 50, m-Aramid (Nomex®) paper is impregnated with phenol resin to achieve an enhancement of both the strength and vacuum property.

The honeycomb core element 50 made of aramid paper is 0.016 g/cm$^3$ in density (bulk density of 0.016) and 5 Kg/cm$^2$ in compression strength that reaches a sufficient level to withstand the atmospheric pressure of 1 Kg/cm$^2$. In this way, the honeycomb core element 50 of aramid paper is lower in density than continuous foam material of density of approximately 0.15 g/cm3 (bulk density of 0.15) that is commonly used for the prior art vacuum heat-insulating panel or block, but higher in compression strength and much better in shearing strength and rigidity, and thus, it is assured that this honeycomb core element can have the panel strength required for structural members.

The surface element 60 is made for example of plate of aluminum alloy and has its four sides bent to provide protection covers 65. The surface element 60 is fitted on the honeycomb core element 50 at its top and bottom surfaces to cover it.

At this time, additional and/or supplementary components including at least the bonding cloth 70 of thermoplastic fiber are interposed between the honeycomb core element 50 and the surface element 60.

Figure 4:
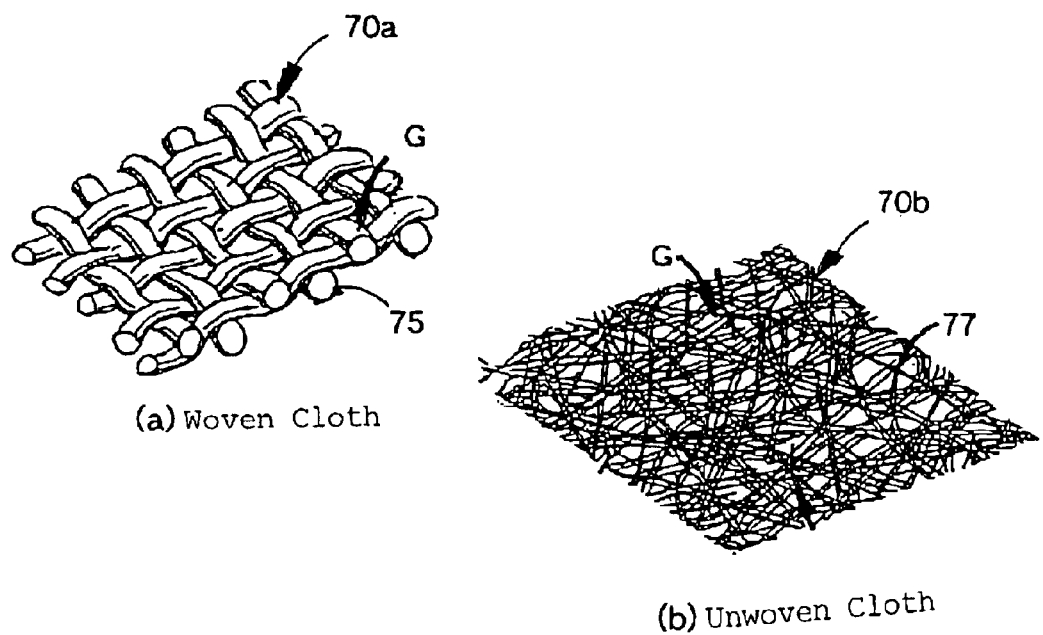
FIG. 4 is a diagram illustrating a bonding element.

The bonding cloth 70 is made of woven cloth 70a weaved of thermoplastic fiber 75 or unwoven cloth 70b formed of fibrous thermoplastic resin 77 (see FIG. 4). The bonding cloth 70 has gaps or pores G and is air-permeable. It is also rigid at the ambient temperature, and if the atmospheric pressure is applied upon the surface plate element, the cloth retains its shape as it was at the moment when it was initially applied. The bonding cloth 70 is preferably made of synthetic resin, such as denatured nylon, polycarbonate, and polyolefin, which does not produce gas when heated and fused.

The surface element 60 fit to the honeycomb core element is further covered with the synthetic resin film 80, and is evacuated into a vacuum condition. Air inside the cells 51 of the honeycomb core element 50 is passed through the air-permeable bonding cloth 70 and evacuated through the clearances 66 defined by the vertically opposite protection covers 65 of at the bent ends of the surface element 60.

After the honeycomb core element 50 is put into vacuum condition, the fibrous bonding cloth 70 is fused under heat and pressure to bond the surface element 60 to the core element 50.

In this embodiment, thermosetting resin film 90 is provided between the bonding cloth 70 and the surface element to reinforce the air-tight sealing of the surface element to the core element 50.

The thermosetting resin film 90 is heated and fused into liquid. The liquidized resin fills the clearances in the bonding cloth 70 and enhances the air-tight sealing between the surface element 60 and the core element 50.

The procedures of manufacturing the vacuum heat-insulating panel according to the present invention will now be described in stepwise order.

Figure 5:
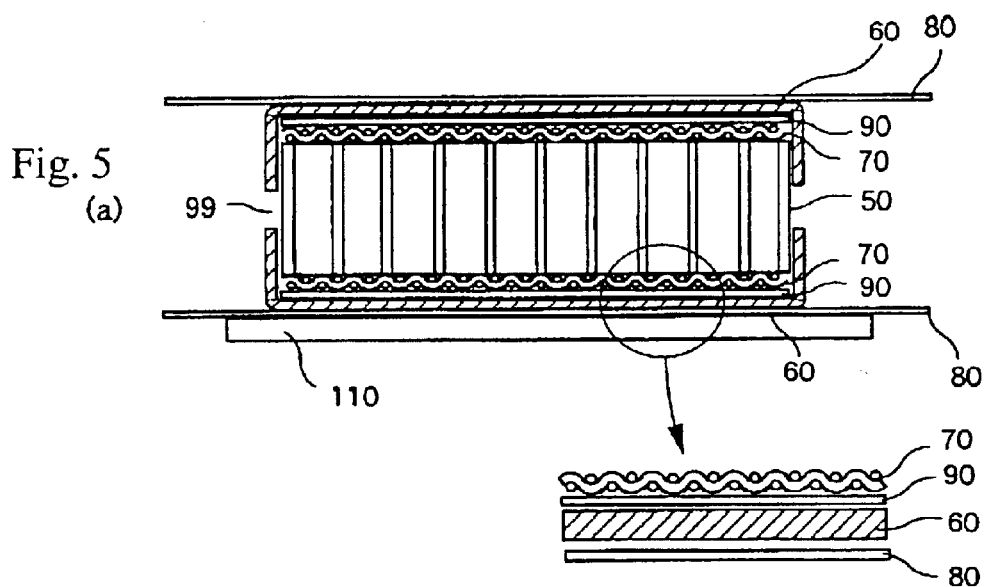
FIG. 5 is a diagram illustrating stepwise manufacturing procedures of the vacuum heat-insulating panel.
Figure 5:
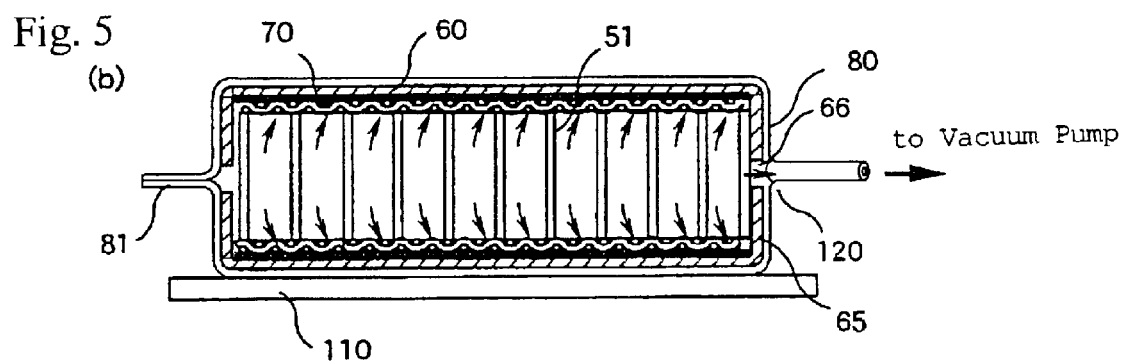
Figure 5:
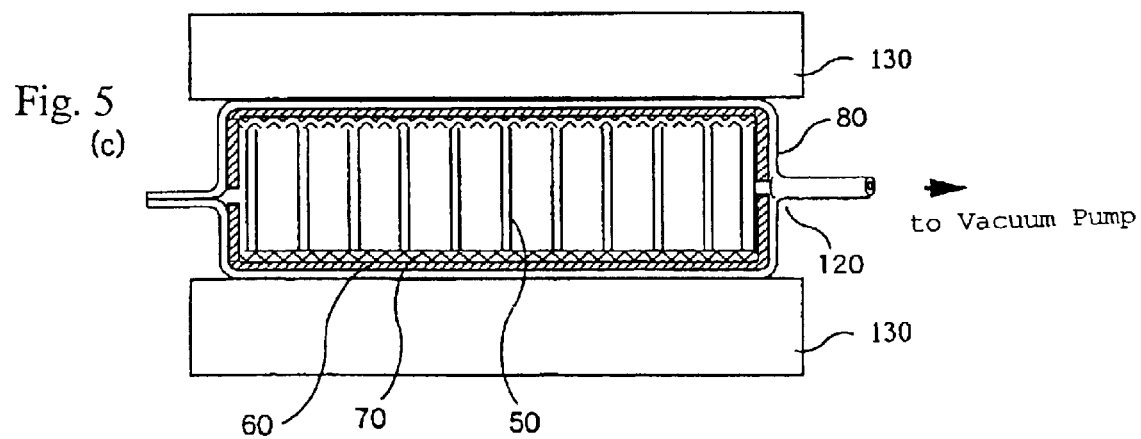

In a laminating procedure as can be seen in FIG. 5(*a*), components are superposed one over another in a multi-layered configuration on a jig plate (fixed table) in the following order; the synthetic resin film (vacuum pack coating material) 80, the surface element 60, the thermosetting resin film 90, the thermoplastic fibrous bonding cloth 70, the honeycomb core element 50 with a small amount of deoxidizer added in the cells, the thermoplastic fibrous bonding cloth 70, the thermosetting resin film 90, the surface element 60, and the synthetic resin film 80.

In a vacuum developing procedure as will be recognized in FIG. 5(*b*), first the synthetic resin film (vacuum pack coating material) 80 has its vertically opposed edges joined and sealed to create seal portions 81. A vacuum port 120 is attached to a portion of the seal portions 81.

The vacuum port 120 is coupled to a vacuum pump through a conduit tube to pump air out of the honeycomb core and evacuate it in a vacuum condition. Simultaneously, the air in the cells flows through the pores G in the fibrous bonding cloth 70 along the surface element 60 and drawn out through the clearance defined by the opposed protection covers 65 at the bent ends of the surface element 60.

In a thermal bonding procedure as in FIG. 5(*c*), after checking a vacuum gage to confirm that the inside of the cells of the honeycomb core 50 are vacuum, the multi-layered element taken off the jig plate 110 or along therewith is set up in a hot press 130, and the whole multi-layered element is heated.

While heated, the bonding cloth 70 of thermoplastic adhesive resin is fused to bond the surface element 60 to the honeycomb core 50. The fusing often causes the bonding cloth to develop gas, and hence, the air is continuously evacuated by the vacuum pump during the heating. The thermosetting resin film 90, when heated, is liquidized and infiltrates in the pores of the bonding cloth 70 to enhance the air-tight sealing to the surface element 60.

Figure 6:
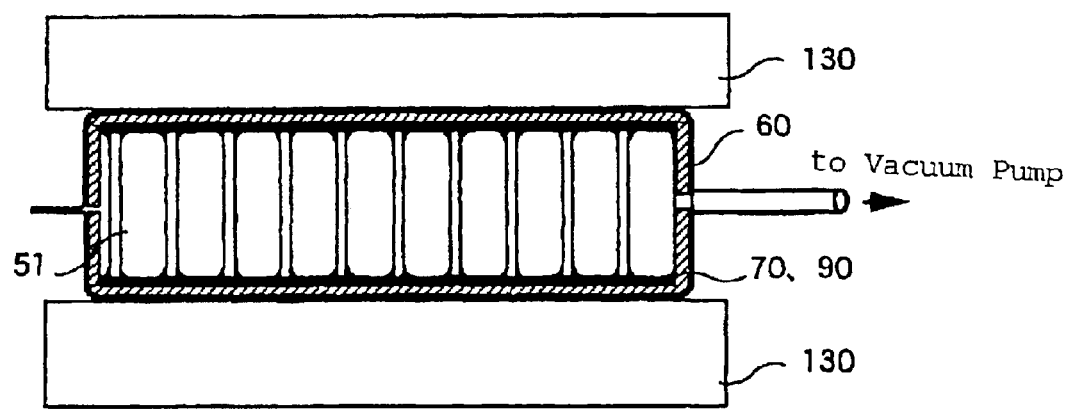
FIG. 6 is a diagram illustrating a stage of the manufacturing process of the vacuum heat-insulating panel.

In a cooling procedure as in FIG. 6, the multi-layered element is cooled down to the ambient temperature while being pressed in the hot press.

The thermoplastic bonding cloth 70 and the thermosetting resin film 90 are fused to provide a bonding interface at a junction of the honeycomb core 50 to the surface element. The cells 51 of the honeycomb core 50 have their respective top and bottom openings covered with the surface element 60 and isolated under a vacuum condition from the outside.

In an ejecting procedure in FIG. 2, the multi-layered element is ejected from the hot press 130; the vacuum port 120 is plugged out; and the synthetic resin film 80 serving as a vacuum pack is peeled off the multi-layered element to expose a finished panel 100.

The vacuum heat-insulating panel 100, which is fabricated in the above-mentioned way having the honeycomb core element at its center, has the cells 51 of the honeycomb core element respectively independent of one another, and therefore, even if the panel 100 is cut or punched to create a hole, the whole remaining panel portion except for cutting edges and the opening and its periphery would not degrade in its properties of thermal break and sound block.

Thus, after the panel of a standard size is fabricated, the panel can be cut into pieces of desired dimensions, depending on uses and applications, or maybe provided with a hole (holes) at desired locations.

Additionally, the stepwise procedures of laminating and heating enable a fabrication of the vacuum heat-insulating panel having long lasting heat insulating and sound blocking properties.

Figure 7:
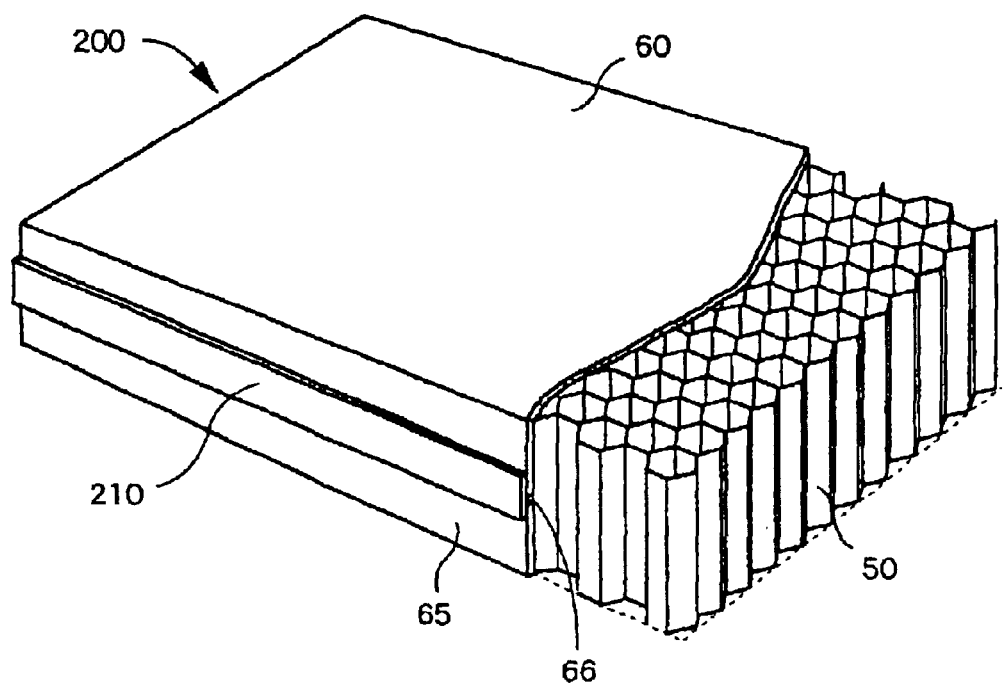
FIG. 7 is a perspective view showing another embodiment of the vacuum heat-insulating panel.

Now, referring to FIGS. 7 and 8, another embodiment of the vacuum heat-insulating panel will be described. Similar components to those of the aforementioned vacuum heat-insulating panel 100 are denoted by the same reference numerals, and explanations of them are omitted.

A vacuum heat-insulating panel 200 in this embodiment is covered with the surface element 60 which has its opposite ends bent inward to provide protection covers 65 over the honeycomb core element 50. The clearances 66 defined between the vertically opposite protection covers 65 of the surface element 60 are sealed with a sealing element 210.

In this manner, the clearances 66 of the surface elements surrounding the vacuum heat-insulating panel 200 are also covered to eliminate a risk of air infiltration, and thus, the vacuum heat-insulating panel 200 has an enhanced air-tight sealing and attains long lasting heat insulating and sound blocking effects.

A method of manufacturing the vacuum heat-insulating panel 200 will be described in conjunction with FIG. 8.

Figure 8:
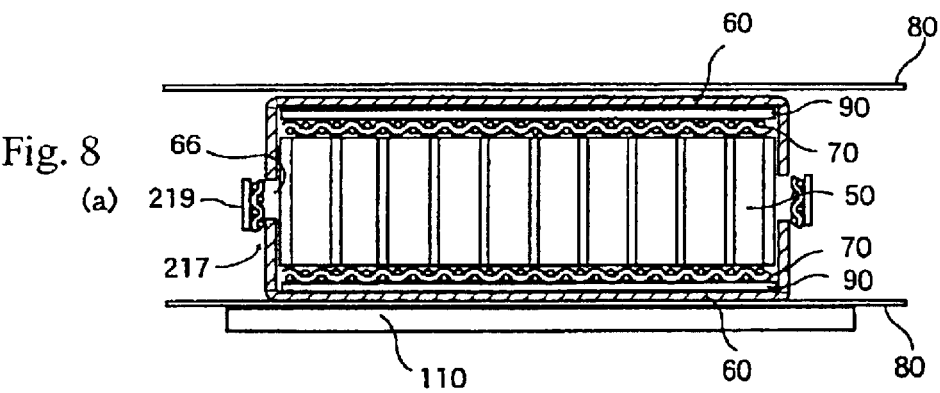
FIG. 8 is a diagram illustrating stepwise manufacturing procedures of the embodiment in FIG. 7.
Figure 8:
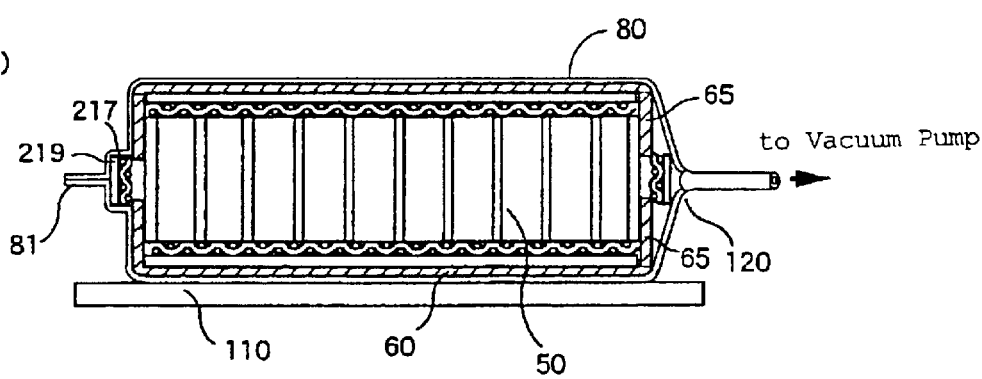
Figure 8:
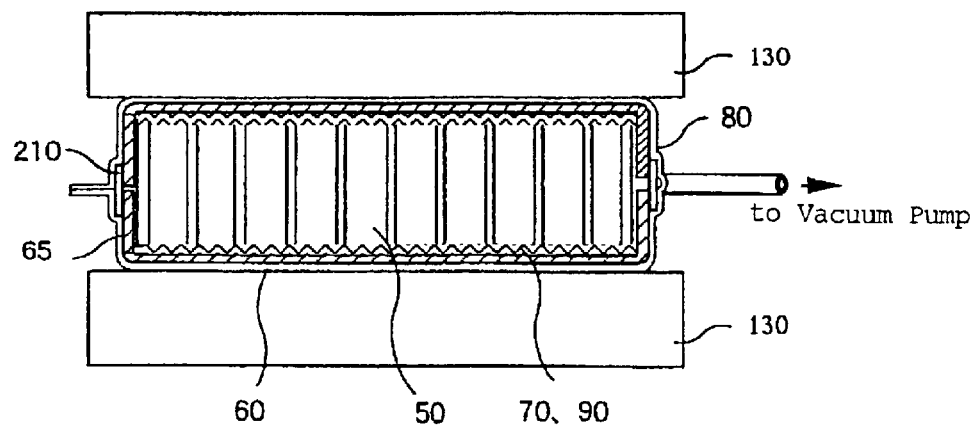

In a laminating procedure as can be seen in FIG. 8(*a*), on a jig plate (fixed table)110, the honeycomb core element 50 is superposed with components of multi-layered configuration one over another in the following order; that is, the thermoplastic fibrous bonding cloth 70, the thermosetting resin film 90, the surface element 60, and the heat-resistant synthetic resin film 80. After that, over the clearances 66 defined between the opposite protection covers 65 of the bent ends of the surface elements 60, a bonding cloth strip 217 and a thermosetting bonding film strip 219 are applied, both of which are dimensioned at least to be wider than the clearances 66.

In a vacuum developing procedure as will be recognized in FIG. 8(*b*), first the synthetic resin film (vacuum pack coating material) 80 has its vertically opposed edges joined and sealed to provide seal portions 81. A vacuum port 120 is attached to part of the seal portions 81.

The vacuum port 120 is coupled to a vacuum pump through a tube to pump air out of the honeycomb core 50 and evacuate it in a vacuum condition. Simultaneous with this, the air in the cells 51 flows through pores in the fibrous bonding cloth along the surface element 60 and drawn through the bonding cloth strip 217 and the thermosetting bonding film strip 219 which are applied over the clearances 66 defined by the opposed protection covers 65 at the bent ends of the surface element 60.

In a thermal bonding procedure as in FIG. 8(c), the whole multi-layered element is heated by a hot press 130.

The heating permits the bonding cloth 70 to adhesively couple the surface element 60 to the honeycomb core element 50 and also allows the thermosetting resin film 90 to be liquidized and fill the pores in the fused bonding cloth. The bonding cloth strip 217 and the thermosetting resin film 219 are fused and fill the clearances 66 in the surface elements 60 to serve as the sealing material 210.

After that, the multi-layered element is cooled to finish the vacuum heat-insulating panel 200.

The vacuum heat-insulating panel 200, which is fabricated in this way having the honeycomb core element at its center, has the clearances 66 sealed between the protection covers 65 at the opposite bent ends of the surface elements 60, and therefore, it has an enhanced air-tight sealing and attains a long lasting vacuum level in the honeycomb core element.

Figure 9:
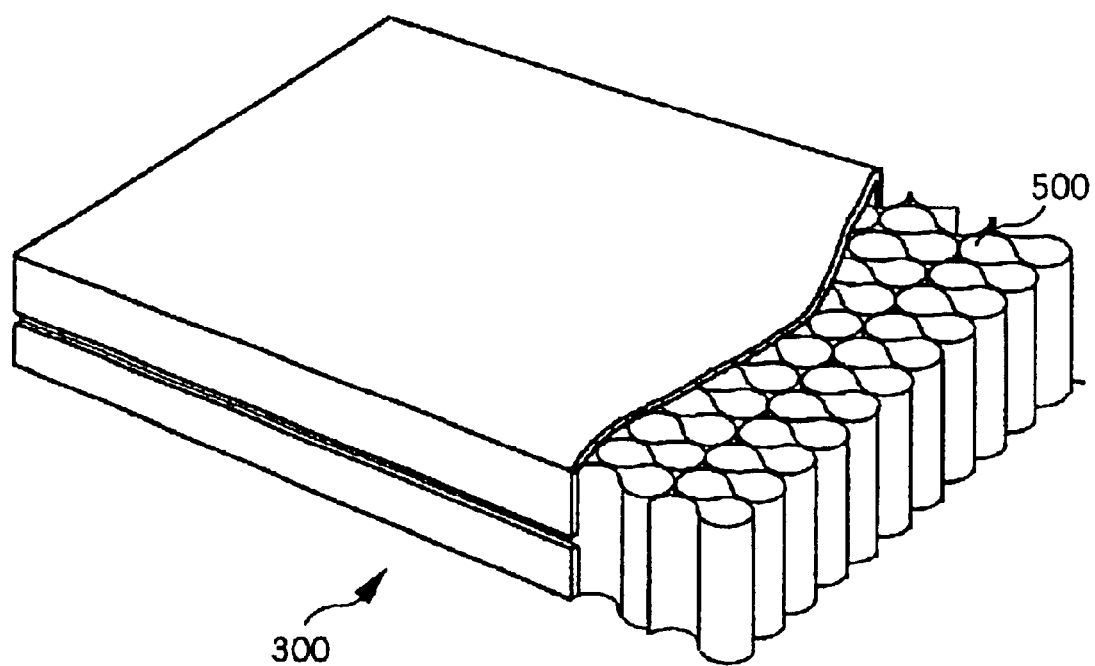
FIG. 9 is a perspective view showing another embodiment of the vacuum heat-insulating panel.

Although an example where the honeycomb structure is used for the core element has been described, a roll core 500 having a circular cross-section may be replaced, as shown in FIG. 9, to obtain the similar effects.

Figure 10:
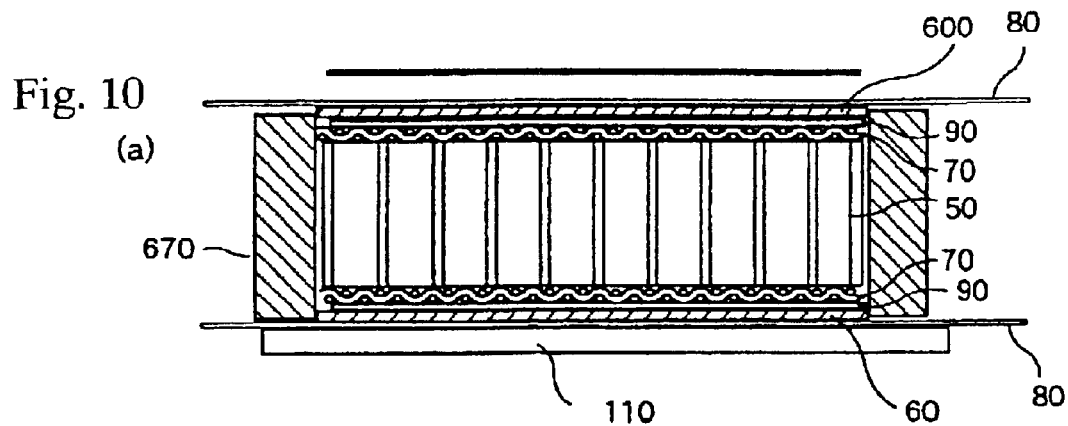
FIG. 10 is a diagram illustrating stepwise manufacturing procedures of the embodiment in FIG. 9.
Figure 10:
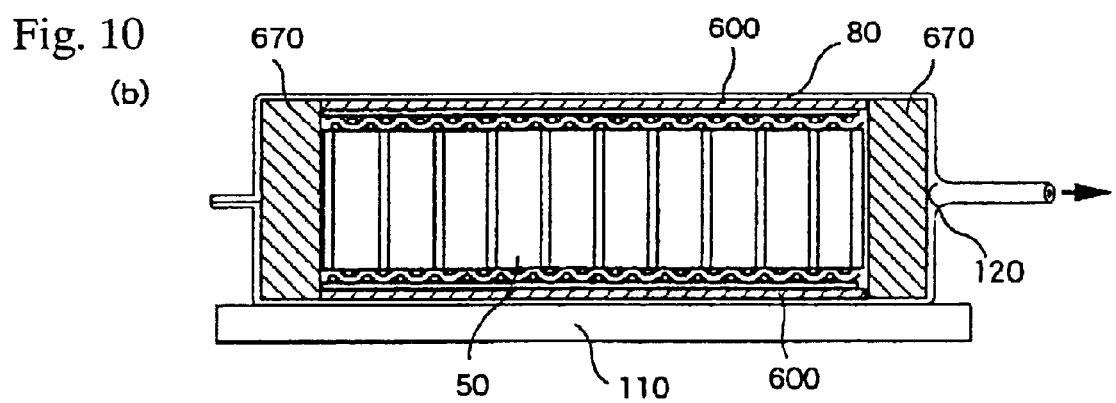
Figure 10:
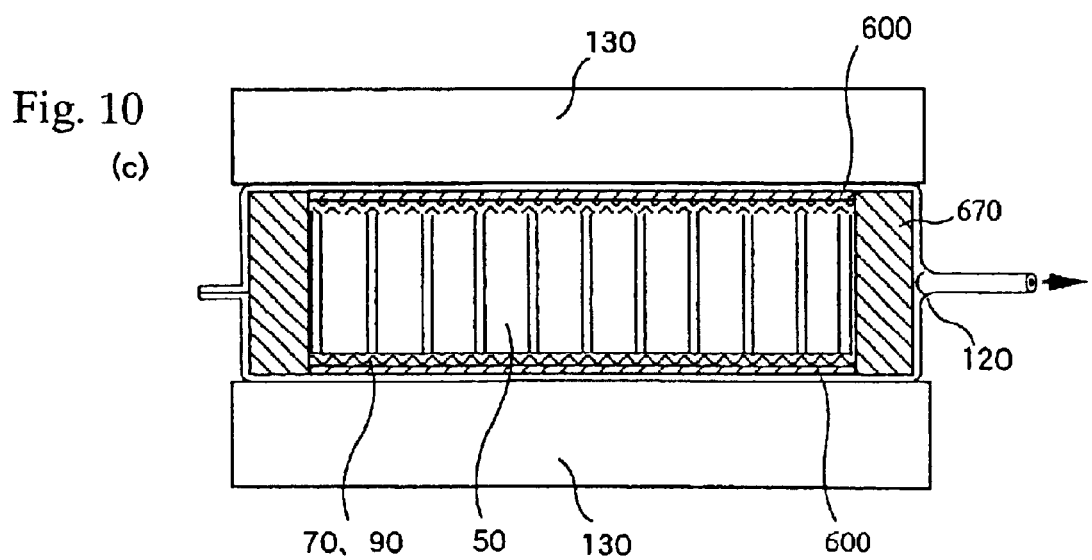

Alternatively, as can be seen in FIG. 10, bank 670 may be provided at ends of the honeycomb core element 50 till the completion of the bonding to prevent the honeycomb core element from collapsing due to the external atmospheric pressure.

For example, the honeycomb core element 50 has its top and bottom surfaces superimposed with the bonding cloth 70 of fibrous adhesive, the thermosetting bonding film 90, and a plate-like surface element 600 arranged one over another in a multi-layered configuration while the honeycomb core element 50 has its sides provided with the banks 670. Then, the multi-layered element along with the banks 670 is covered with the synthetic resin film 80, and thereafter, air is evacuated from the inside (see FIGS. 10a and 10b).

The bonding layers are fused in the hot press 130 to bond the surface element 60 to the honeycomb core element 50.

Figure 11:
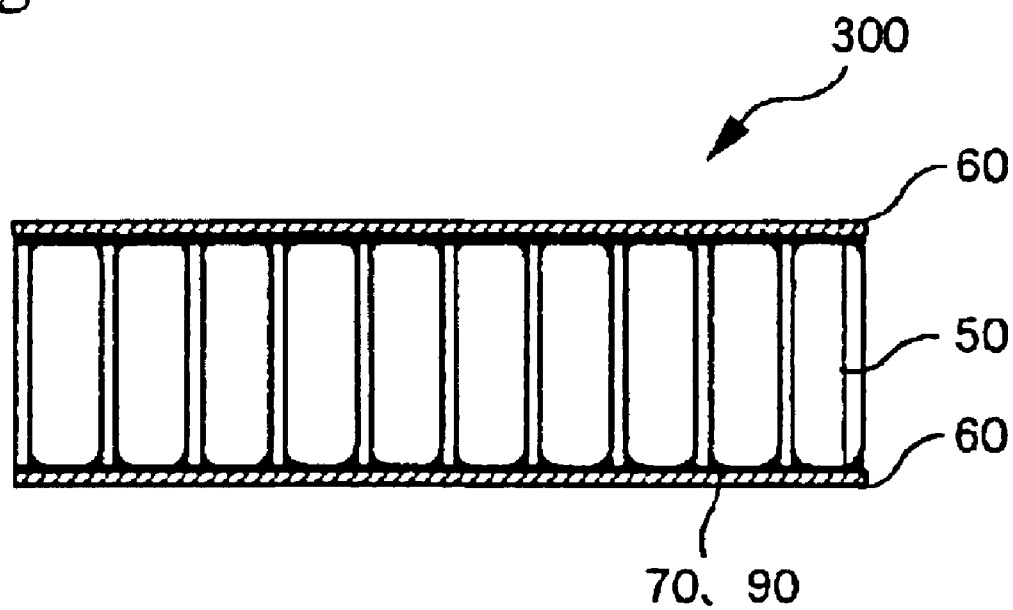
FIG. 11 is a sectional view showing still another embodiment of the vacuum heat-insulating panel.
Figure 12:
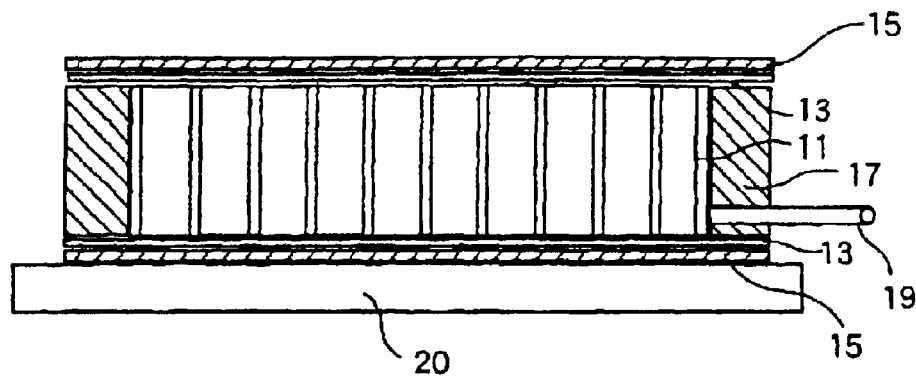
FIG. 12 is a diagram illustrating stepwise manufacturing procedures of a prior art embodiment of the vacuum heat-insulating panel.
Figure 12:
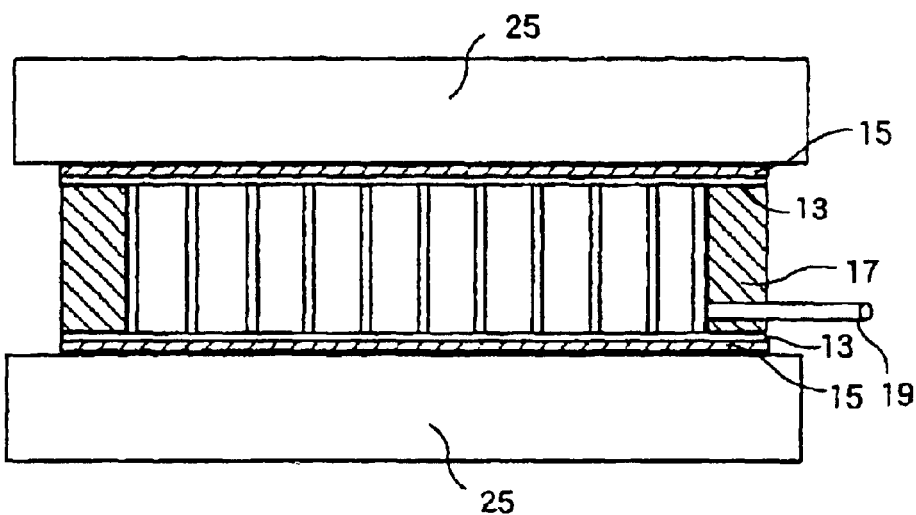
Figure 12:
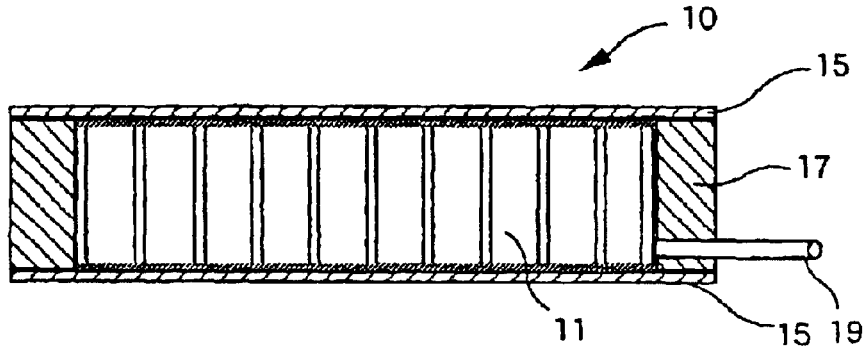
Figure 13:
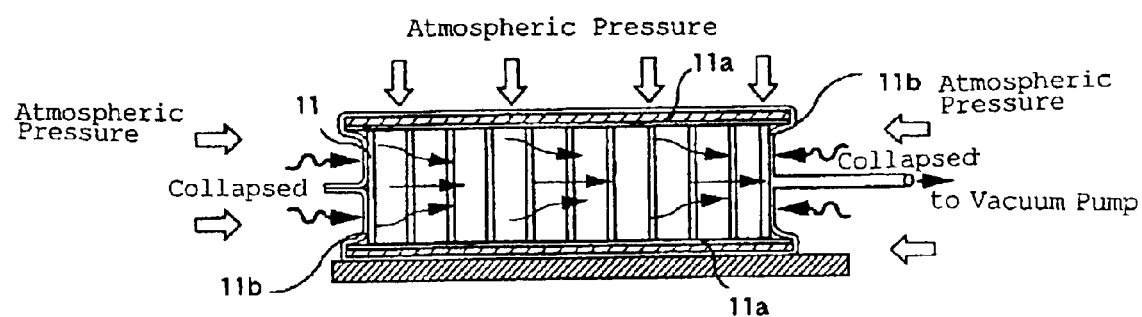
FIG. 13 is a diagram showing the prior art vacuum heat-insulating panel.

After the multi-layered element is ejected from the hot press, the banks 670 and the synthetic resin film 80 covering the whole element are peeled off to obtain a finished panel 300 (see FIG. 11).

Without providing the protection covers of the bent ends in the surface element 600, the vacuum heat-insulating panel 300 configured in this manner would not get the core element collapsed due to the atmospheric pressure till the end of the bonding procedure.

As has been described, the present invention facilitates a simplified and cost-effective fabrication of a vacuum heat-insulating panel with a non-permeable core element at its center, having heat insulating/sound blocking effects and enhanced strength.

Also, in accordance with the present invention, if the panel is cut off or cut out to make an opening, only those parts destructively lose the heat insulating/sound blocking properties, but the whole remaining panel portion would not degrade in those properties, realizing a long lasting air-tight sealing. In this way, since the panel permits itself to be cut into various shapes or punched as required for uses and applications, there is no need of fabricating a variety range of the panels of various dimensions for various applications, and consequently, one type of the panel of a standard size covers all the commercial demands for the vacuum heat-insulating panel having the heat insulating and sound blocking features.

Furthermore, since the surface element has its ends bent to provide protection covers, the core element can retain an original shape at its lateral ends from the beginning of the procedure of depressurizing into a vacuum condition till the end of the panel bonding.

Although the preferred embodiments of the present invention have been described, these are provided simply by way of example but not for limitation. Variations, modifications, and changes of the features, objects, and advantages of the disclosure herein that can be envisioned by a person having ordinary skills in the art should be included in the range of the present invention if they do not depart from the true spirit and scope of the invention as defined in the appended claims.

What is claimed is:

1. A vacuum heat-insulating panel comprising a vacuum core element, a bonding element and a surface element, wherein the vacuum core element is formed of independent, evacuated cells of a honeycomb core element made of a non-air-permeable material, and wherein the bonding element is fused to both the non-air-permeable material and the surface element to bond the surface element to the vacuum core element and to vacuum seal the independent, evacuated cells.

2. A vacuum heat-insulating panel according to claim 1, wherein the bonding element, prior to being fused, is either a woven cloth made of fibrous adhesive of thermoplastic resin, or an unwoven cloth overlaid with a fibrous adhesive in a multi-layered sheet.

3. A vacuum heat-insulating panel according to claim 1, wherein the bonding element, prior to being fused, is either a woven cloth made of fibrous adhesive, or a multi-layered sheet of unwoven cloth overlaid with a fibrous adhesive and a thermosetting synthetic resin film.

4. A vacuum heat-insulating panel according to claim 1, wherein the surface element has its edges bent to provide protection covers.

5. A vacuum heat-insulating panel according to claim 1, wherein the panel is formed by a method comprising the steps of superposing the honeycomb core element with the surface element through an adhesive interposed therebetween to produce a multi-layered element, covering the multi-layered element with a synthetic resin film and evacuating the air within the cover of the synthetic resin film into a vacuum condition to produce a vacuum core element, and heating and pressing the covered multi-layered element having the vacuum core element at its center, thereby bonding the surface element to the core by the adhesive, the honeycomb core element being made of a non-air-permeable material, the adhesive being either woven or unwoven cloth of fibrous thermoplastic resin, the air inside the core being evacuated through pores in the woven or unwoven cloth during the step of evacuating air to create a vacuum condition, and the adhesive being fused so as to form the bonding element and to bond the surface element to the core during the step of heating and pressing 6. A vacuum heat-insulating panel according to claim 5, wherein the adhesive is either woven or unwoven cloth of fibrous thermoplastic resin superposed with a thermosetting resin film into an adhesive multi-layered sheet, and during the step of heating and pressing, the thermosetting resin film in the adhesive multi-layered sheet is fused and liquidized to fill the clearances in a bonding interface between the core and the surface element.

7. A vacuum heating-insulating panel according to claim 1, wherein the bonding element is a material selected from the following group of materials; denatured nylon, polycarbonate the polyolefin.

8. A vacuum heat-insulating panel according to claim 1, wherein non-air-permeable material of the honeycomb core element is a material selected from the following group of materials; polyethylene terephthalate (PET); polyimide; kraft paper impregnated with resin; aramid paper impregnated with resin.

9. A vacuum heat-insulating panel according to claim 1, wherein the honeycomb core element is a roll core having a circular cross-section.

10. A vacuum heat-insulating panel according to claim 1, wherein the honeycomb core element is hexagonal shaped.

11. A vacuum heat-insulating panel comprising a vacuum core element, a bonding element and a surface element, wherein the vacuum core element is formed of independent, evacuated cells of a honeycomb core element made of a non-air-permeable material, and wherein the bonding element is fused to both the non-air-permeable material and the surface element to bond the surface element to the vacuum core element and to vacuum seal the independent, evacuated cells, wherein the surface element has its edges bent to provide protection covers, and wherein a seal material is provided over a clearance defined by the opposed protection covers bent from the top and bottom surface elements.

12. A vacuum heat-insulating panel comprising a vacuum core element, a bonding element and a surface element, wherein the vacuum core element is formed of independent, evacuated cells of a honeycomb core element made of a non-air-vermeable material, and wherein the bonding element is fused to both the non-air-permeable material and the surface element to bond the surface element to the vacuum core element and to vacuum seal the independent, evacuated cells, wherein the honeycomb core element is soaked in and impregnated with liquid latex rubber.

13. A vacuum heat-insulating panel comprising a vacuum core element, a bonding element and a surface element, wherein the vacuum core element is formed of independent, evacuated cells of a honeycomb core element made of a non-air-permeable material, and wherein the bonding element is fused to both the non-air-permeable material and the surface element to bond the surface element to the vacuum core element and to vacuum seal the independent, evacuated cells, wherein the honeycomb core element comprises aramid paper.

14. A vacuum heat-insulating panel comprising a vacuum core element, a bonding element and a surface element, wherein the vacuum core element is formed of independent, evacuated cells of a honeycomb core element made of a non-air-permeable material, and wherein the bondinig element is fused to both the non-air permeable material and the surface element to bond the surface element to the vacuum core element and to vacuum seal the independent, evacuated cells, wherein the surface element is made of a plate of a plate of aluminum alloy.

* * * * *